Feb. 4, 1975 R. A. WILLIAMS Re. 28,328
LATCH TYPE PYROTECHNIC DETONATOR CIRCUIT TEST PROBE
Original Filed Nov. 21, 1968
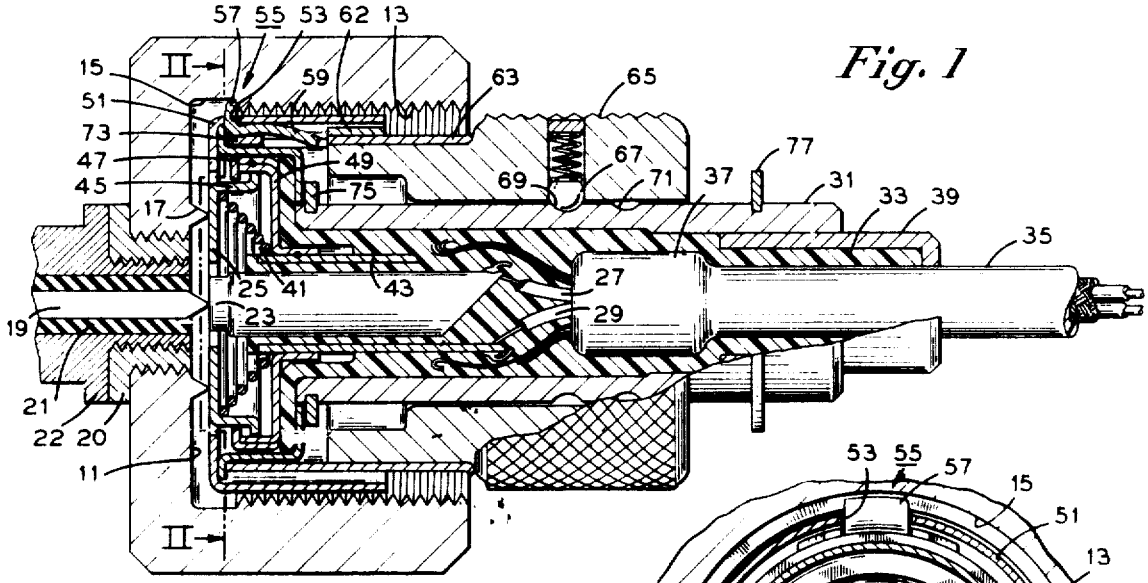
Fig. 1
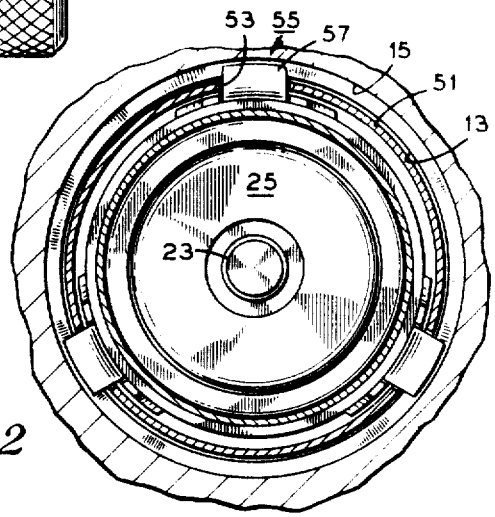
Fig. 2
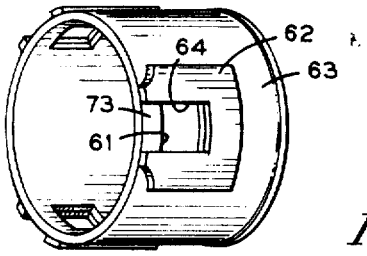
Fig. 3
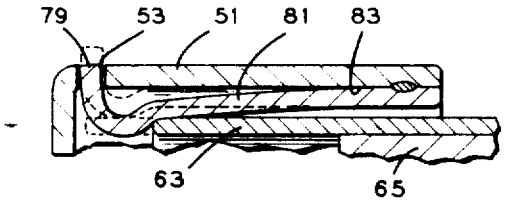
Fig. 4
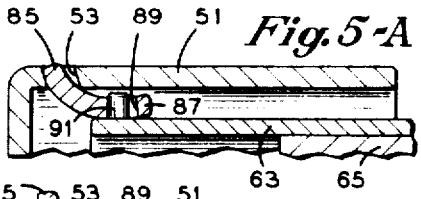
Fig. 5-A
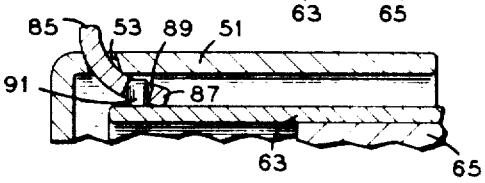
Fig. 5-B
INVENTOR
Robert A. Williams
BY
Wofford & Felsman
ATTORNEYS United States Patent Office Re. 28,328
Reissued Feb. 4, 1975

28,328

LATCH TYPE PYROTECHNIC DETONATOR CIRCUIT TEST PROBE

Robert A. Williams, Fort Worth, Tex., assignor to Williams Instruments, Inc., Fort Worth, Tex.

Original No. 3,555,490, dated Jan. 12, 1971, Ser. No. 777,674, Nov. 21, 1968, which is a continuation-in-part of Ser. No. 756,085, Aug. 14, 1968. Application for reissue June 16, 1971, Ser. No. 153,906
Int. Cl. H01r *13/24, 17/18, 33/14*
U.S. Cl. 339—91 R 12 Claims

Matter enclosed in heavy brackets [ ] appears in the original patent but forms no part of this reissue specification; matter printed in italics indicates the additions made by reissue.

ABSTRACT OF THE DISCLOSURE

A test probe apparatus having electrical contacts for detecting electrical energy in breech caps or pyrotechnic cartridge wells that in operation carry an explosive for discharging weapons, the apparatus including latch elements for securing the probe. The latch elements have radially extending fingers mounted on an axially extending base, and are adapted to extend [through elongated] *outwardly from a sleeve* [apertures in an extremity of a shell] carried on one end of the probe. The fingers are actuated by [a movable] *said* sleeve [having a portion inside the shell] *which is adapted* for movement between forward and rearward positions to selectively move the fingers outward for engaging a thread relief groove or equivalent.

CROSS-REFERENCE TO RELATED APPLICATION

This application is a continuation-in-part of an application entitled, Pyrotechnic Detonator Circuit Test Probe, Ser. No. 756,085, filed Aug. 14, 1968, now Pat. No. 3,505,635.

BACKGROUND AND GENERAL DISCUSSION

As explained in the above mentioned copending application, it is essential in the interest of safety that bombs be forcibly ejected from high speed aircraft. To accomplish this result it is common to use pyrotechnic cartridges located in wells carried by the aircraft, such cartridges making electrical connection with a detonator circuit. When the detonator circuit is energized, the cartridge emits high pressure gas which may, for example, release a latching device and eject a bomb. Premature ejection of a bomb occurs when arming an aircraft if the detonator has been accidentally or inadvertently energized. Accordingly, it is essential that the detonator circuit of such devices be tested for the presence and quantity of electrical energy prior to arming the aircraft. Such testing is performed on flight lines where time and reliability are critical.

In my copending application I disclose pyrotechnic detonator circuit test probes that have cam follower and retainer elements reciprocably mounted within apertures in the probe for selective movement outward by a movable sleeve to engage preferably the threads in a cartridge well.

The present invention relates to a test probe having latch elements that function in a more positive manner than those described in my copending application. [Broadly] *In one aspect,* the test probe of this invention may be described as one having latch elements carried between the [body] *shell* of the probe and a sleeve mounted on one of its ends, each latch element having a radially extending finger mounted to extend through one of plural elongated apertures at the extremity of the probe and an axially extending base connected with and actuated by a movable sleeve such that the fingers extend through apertures in a shell carried by the body. Thus, a thread relief groove on a breech cap or equivalent may be engaged by the fingers for secure engagement of the probe with the cap. Moreover, damage to threads is avoided, *if the fingers are latched into said groove.*

*In another aspect of the present invention, the latch elements extend from the sleeve and have fingers adapted to move outward beyond the outer periphery of the probe and inward of said periphery, irrespective of whether the fingers latch into a groove or in the threads themselves, when the sleeve moves forward or rearward. A surface means carried by the body directs the fingers outward when the sleeve moves in a selected direction.*

BRIEF DESCRIPTION OF THE FIGURES OF THE DRAWING

FIG. 1 is a side elevational view in fragmentary section illustrating a pyrotechnic detonator circuit test probe embodying the principles of my invention; FIG. 2 is a side elevational view as seen from the left side of the apparatus shown in FIG. 1; FIG. 3 is a perspective view of the shell which forms a portion of the test probe of FIG. 1; FIG. 4 is a fragmentary longitudinal section of an alternate form of latch element; and FIGS. 5–A and 5–B show another form of latch element in two different positions.

DESCRIPTION OF PREFERRED EMBODIMENTS

The numeral 11 in the drawing designates the interior of a breech cap having threads 13 on an exterior portion thereof which intersect a thread relief groove 15. The material of which the cartridge 11 is fabricated is electrically conductive in this instance, having a portion 17 in the form of an annular electrical contact. A second electrical contact 19 is disposed centrally inside insulation 21 and mechanical threaded connectors 20, 22.

A pair of electrical contact *means,* referred to as an inner contact 23 and outer contact 25, are exposed on one end portion of a test probe and are connected respectively with two insulated electrical conductors 27, 29 which extend through the body 31 of the test probe.

The body 31, which may be electrically conductive, is filled with an insulating material 33 that helps secure the electrical conductors 27, 29. Additional insulating material 35 that circumscribes the conductors 27, 29 has a protruding end portion 37 which, along with a cap 39, is secured to the end of the probe opposite the contacts 23, 24 and insures a strong connection between the electrical conductors 27, 29 and the body 31.

The inner contact 23, which here is of the resiliently compressible form shown in my copending application, is connected with the electrical conductor 27, while the outer contact 25 is connected by means of a conical spring 41 (which may be replaced with concentric cylindrical springs as shown in my copending application) with a stationary core 43 secured to electrical conductor 27. The outer contact 25 includes in this instance an axially movable plate urged outward by the spring 41 and confined by a flange portion 45 which extends outward to a radial position larger than the smallest diameter of a lip portion 47 secured to a stationary transverse face 49 that is in turn secured to the stationary core 43.

The peripheral end portion of the test probe is defined by an annular shell 51 having peripherally elongated apertures 53 with which the latch elements 55 mate and through which they extend *selectively beyond the outer periphery of the probe and inward of said periphery.* The latch elements as shown in FIG. 1 each have a radially extending finger portion 57 and an inwardly extending arcuate base 59 adapted to protrdue through apertures 61

(see FIG. 3) formed in a ring portion 63 forming a part of a movable *means, here,* sleeve 65. A plate 62 secured to the exterior of the ring portion 63 partially surrounds the apertures 61 to confine the latch elements 55.

The movable sleeve 65 is mounted on the body 31 of the probe to move between a forward position in which the resiliently mounted ball 67 engages an indentation 69, and a rearward position in which the ball 67 engages a second indentation 71. When in the forward position, the sleeve forward portion 73 (see FIGS. 1 and 3) engages the latch element inside the radially extending finger portion 57 to urge the finger portion outward through the aperture 53. Movement of the sleeve toward its rearward position causes its forward portion 73 to engage the inner surface of the inwardly extending arcuate base 59 of the latch element 55. This causes the arcuate base 59 to move outward, with consequent inward movement of the finger portion 57 such that the probe may be retracted past the threads 13 in the cartridge well. A first snap ring 75 is secured to the body to resist axial movements of the forward stationary parts, and a second snap ring 77 is secured to a rearward portion of the body 31 to limit axial movements of the movable sleeve 65.

In FIG. 4 is illustrated an embodiment of the invention in which the shell 51 has an aperture 53 through which extends a radially extending finger portion 79 connected with an axially extending base 81 secured to an inner surface 83 of the sleeve. The base tapers inward and forward into the path of travel of the ring portion 63 of the movable sleeve 65 to selectively extend or retract the finger into engagement with a surface in a cartridge well.

In FIGS. 5–A and 5–B are illustrated an embodiment in which the shell 51 has apertures 53 through which may extend fingers that comprise an arcuate radially extending portion 85 and an axially extending base portion 87 having an aperture 89 that receives a retainer pin 91 that extends from the ring portion 63 of the movable *means, here,* sleeve 65. FIG. 5–A shows the finger in its retracted position when the movable sleeve 65 is in its rearward position, and FIG. 5–B shows the finger 85 in its extended position when the movable sleeve is in its forward position. The *surface* contour of the aperture [55 and] *53 comprises means carried by the test probe which with* the surface of the finger 85 cooperate to move the finger inward and outward as shown.

It should be apparent from the foregoing that I have provided an invention having significant advantages. The configuration of the latch elements enables positive locking on a groove such as a thread relief groove of a breech cap in a manner to provide positive engagement. The configuration of the latch elements enables them to be placed at the extreme forward end of the probe such that they may engage a relief groove of the configuration shown in FIG. 1, thus avoiding damage to the threads that are often of aluminum alloy. The probe is secured in a manner that will not fail even though relatively large axial forces are applied to the conductors 27, 29. When using resiliently mounted inner and outer contacts 23, 25, there is assurance that no break can occur in electrical connection.

While I have shown my invention in only a few of its forms, it should be apparent to those skilled in the art that it is not so limited, but is susceptible to various changes and modification without departing from the spirit thereof.

I claim:

1. A pyrotechnic detonator circuit test probe comprising:

an elongated body;

a pair of electrical contacts secured to an end region of the body;

two electrical conductors extending through the body and communicating respectively with said contacts;

a shell secured to the end region of the body generally circumscribing the contacts, and having a plurality of radially oriented apertures;

a movable sleeve carried by the body to move between forward and rearward positions and having a portion extending between the shell and the body;

latch elements carried between the [body] *shell* and the sleeve, each having a radially extending finger mounted to extend through one of said apertures and an axially extending base connected with and actuated by the movable sleeve resulting in selective protrusion of each finger through the associated aperture.

2. The test probe defined by claim 1 wherein each finger comprises a radially extending portion of an elongated metal strip and an axially extending base arcuate in longitudinal cross section to curve inward, with the movable sleeve having an aperture oriented below the base of each finger to receive a portion thereof.

3. The test probe defined by claim 1 wherein each finger comprises a radially extending portion of an elongated metal strip and the axially extending base is secured to an inner surface of the shell and tapered inward and forward into the path of travel of the movable sleeve.

4. The test probe defined by claim 1 wherein each finger comprises an arcuate, radially extending portion and a base portion having an aperture therein, and a retainer pin extends from the sleeve into the aperture in the associated finger.

5. The test probe defined by claim 1 in which the electrical contacts are resiliently mounted to the body.

6. A pyrotechnic detonator circuit test probe comprising:

an elongated body;

a pair of electrical contacts secured to an end region of the body;

two electrical conductors extending through the body and communicating respectively with said contacts;

a shell secured to the end region of the body generally circumscribing the contacts, and having a plurality of radially oriented elongated apertures at the end region adjacent said contacts;

a movable sleeve carried by the body to move between forward and rearward positions and having a portion extending between the shell and the body;

latch elements carried between the [body] *shell* and the sleeve, each having a radially extending finger mating with *one of* said elongated [aperture] *apertures* and mounted to extend therethrough, and an axially extending base connected with and actuated by the movable sleeve resulting in selective protrusion of each finger through the associated aperture.

7. The test probe defined by claim 6 wherein each finger comprises a radially extending portion of an elongated metal strip and an axially extending base arcuate in longitudinal cross section to curve inward, with the movable sleeve having an aperture oriented below the base of each finger to receive a portion thereof.

8. The test probe defined by claim 6 wherein each finger comprises a radially extending portion of an elongated metal strip and the axially extending base is secured to an inner surface of the shell and tapered inward and forward into the path of travel of the movable sleeve.

9. The test probe defined by claim 6 wherein each finger comprises an arcuate, radially extending portion and a base portion having an aperture therein, and a retainer pin extends from the sleeve into the aperture in the associated finger.

10. The test probe defined by claim 6 in which the electrical contacts are resiliently mounted to the body.

*11. A pyrotechnic detonator circuit test probe comprising:*

*an elongated body;*

*a pair of electrical contacts secured to an end region of the body;*

*two electrical conductors extending through the body and communicating respectively with said contacts;*

*a shell surrounding the end region of the body and defining at least one aperture;*

*a movable sleeve carried by the body to move between*

*forward and rearward positions and having a portion extending between the shell and the body;*

*at least one latch element extending from the sleeve and having an extending finger mounted to extend through said aperture and an axially extending base connected with and actuated by the movable sleeve resulting in selected protrusion of said finger through said aperture.*

*12. A pyrotechnic detonator circuit test probe comprising:*

*a body;*

*electrical contact means supported by the body;*

*electrical conducting means communicating with said contact means;*

*a movable means on said body, movable between forward and rearward positions;*

*latch elements connected to and extending from said movable means and having fingers adapted to move outward and inward upon movement of said movable means;*

*and means carried by said test probe to move said fingers outward and inward upon movement of said movable means.*

References Cited

The following references, cited by the Examiner, are of record in the patented file of this patent or the original patent.

UNITED STATES PATENTS

| | | | |
|---|---|---|---|
| 2,728,062 | 12/1955 | Klostermann | 339—255 R |
| 2,757,351 | 7/1956 | Klostermann | 339—177 R |
| 2,853,690 | 9/1958 | Madison | 339—45 R |

JOSEPH H. McGLYNN, Primary Examiner

U.S. Cl. X.R.

285—316; 339—177 R